US010956392B1

(12) United States Patent
Atkin et al.

(10) Patent No.: US 10,956,392 B1
(45) Date of Patent: *Mar. 23, 2021

(54) METHODS, APPARATUSES, AND COMPUTER PROGRAM PRODUCTS FOR IDENTIFYING FIELDS IN A DATA TREE

(71) Applicant: Allscripts Software, LLC, Raleigh, NC (US)

(72) Inventors: Geoffrey Eugene Atkin, Forest Lake, MN (US); Charles Christopher Horne, Mahtomedi, MN (US)

(73) Assignee: Allscripts Software, LLC, Raleigh, NC (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/042,445

(22) Filed: Jul. 23, 2018

(51) Int. Cl.
*G06F 16/00* (2019.01)
*G06F 16/22* (2019.01)
(Continued)

(52) U.S. Cl.
CPC ........ *G06F 16/2246* (2019.01); *G06F 16/248* (2019.01); *G06F 16/2428* (2019.01)

(58) Field of Classification Search
CPC ............. G06F 16/2246; G06F 16/2428; G06F 16/2423; G06F 16/248; G06F 16/00; G06F 17/30327; G06F 17/30345; G06F 17/30421; G06F 17/30; G06F 16/182; G06F 16/2365; G06F 16/27; G06F 16/2282; G06F 16/215; G06F 16/2462; G06F 16/345; G06F 16/244; G06F 11/30; G06F 11/2094; G06F 11/1004; G06F 11/2056; G06F 11/1076; G06F 11/2064; G06F 21/00; G06F 2201/80

See application file for complete search history.

(56) References Cited

U.S. PATENT DOCUMENTS

| | | | |
|---|---|---|---|
| 4,961,139 A | 10/1990 | Hong et al. | |
| 4,992,972 A * | 2/1991 | Brooks | G06F 9/453 |
| | | | 715/708 |

(Continued)

OTHER PUBLICATIONS

"Non-Final Office Action for U.S. Appl. No. 13/435,814", dated Jun. 27, 2014, 10 pages.

(Continued)

*Primary Examiner* — Anh Ly
(74) *Attorney, Agent, or Firm* — Medley, Behrens & Lewis, LLC

(57) ABSTRACT

Methods, apparatuses, and computer program products are provided for an address system to identify a field and/or a row in a data structure. A method may include receiving a request to modify a field of data, wherein the field of data is identified by a received field key. A method may also include determining whether the field of data was rendered for display. A method may also include modifying the field in a tree structure in an instance in which the field of data was rendered for display, wherein the received field key is configured locate an address object that is related to the field. A method may also include modifying the field of data in a tree structure in an instance in which the field of data was not rendered for display by locating the received field key in a field key lookup map, wherein the field key lookup map is configured to locate the address object.

17 Claims, 8 Drawing Sheets

(51) Int. Cl.
*G06F 16/248* (2019.01)
*G06F 16/242* (2019.01)

(56) References Cited

U.S. PATENT DOCUMENTS

| | | | |
|---|---|---|---|
| 5,826,257 A * | 10/1998 | Snelling, Jr. | G06F 16/284 |
| 5,892,510 A | 4/1999 | Lau et al. | |
| 6,029,170 A * | 2/2000 | Garger | G06F 16/2246 |
| 6,366,917 B1 * | 4/2002 | St. John Herbert, III | |
| | | | G06F 16/284 |
| 6,591,272 B1 | 7/2003 | Williams | |
| 6,721,729 B2 | 4/2004 | Nguyen et al. | |
| 6,880,007 B1 | 4/2005 | Gardos et al. | |
| 7,275,079 B2 * | 9/2007 | Brodsky | G06F 9/541 |
| | | | 709/203 |
| 8,195,641 B2 | 6/2012 | Rucker et al. | |
| 2001/0037331 A1 | 11/2001 | Lloyd | |
| 2002/0161757 A1 * | 10/2002 | Mock | G06F 16/24 |
| 2003/0046272 A1 | 3/2003 | Scanzano et al. | |
| 2003/0056082 A1 * | 3/2003 | Maxfield | G06F 16/284 |
| | | | 712/4 |
| 2003/0154204 A1 * | 8/2003 | Chen-Wright | G06F 16/289 |
| 2008/0270435 A1 * | 10/2008 | Furusho | G06F 16/9027 |
| 2011/0138123 A1 * | 6/2011 | Gurajada | G06F 16/284 |
| | | | 711/118 |
| 2011/0161937 A1 * | 6/2011 | Bounimova | G06F 11/3608 |
| | | | 717/131 |
| 2013/0007698 A1 | 1/2013 | Warila et al. | |
| 2013/0262517 A1 | 10/2013 | Atkin et al. | |

OTHER PUBLICATIONS

"Response to the Non-Final Office Action for U.S. Appl. No. 13/435,814", filed Oct. 9, 2014, 6 pages.
"Final Office Action for U.S. Appl. No. 13/435,814", dated May 17, 2017, 11 pages.
"Response to the Final Office Action for U.S. Appl. No. 13/435,814", filed Aug. 17, 2017, 16 pages.
"Advisory Action for U.S. Appl. No. 13/435,814", dated Sep. 8, 2017, 2 pages.
"Non-Final Office Action for U.S. Appl. No. 13/435,814", dated Dec. 8, 2017, 12 pages.
"Response to the Non-Final Office Action for U.S. Appl. No. 13/435,814", filed Mar. 8, 2018, 22 pages.
"Notice of Allowance and Fees Due for U.S. Appl. No. 13/435,814", dated Apr. 13, 2018, 5 pages.

* cited by examiner

METHODS, APPARATUSES, AND COMPUTER PROGRAM PRODUCTS FOR IDENTIFYING FIELDS IN A DATA TREE

CROSS REFERENCE TO RELATED APPLICATIONS

This application is a continuation of U.S. patent application Ser. No. 13/435,814, filed on Mar. 30, 2012, and entitled "METHODS, APPARATUSES, AND COMPUTER PROGRAM PRODUCTS FOR IDENTIFYING FIELDS IN A DATA TREE," the entirety of which is incorporated herein by reference.

TECHNOLOGICAL FIELD

Embodiments of the present invention relate generally to data management technology and, more particularly, to methods, apparatuses, and computer program products for interacting with data on a remote device.

BACKGROUND

Data that is displayed on a webpage, such as a webpage built using HyperText Markup Language (HTML), may be stored on a remote device, such as a server. The data may be accessed by the webpage in an instance in which the data is requested or the script, markup language or other code is rendered. The remote device may organize the data in a variety of data structures such as a data tree (e.g. a tree, a tree structure and/or the like such as a hierarchical tree structure with a set of linked nodes). For example, a data tree may be modeled around the tables and rows of data in a relational database.

As the data is displayed on the webpage, the data may be described by location information (e.g. location information in a database) that is stored in a string of information that may include information such as the table name, the field name and/or row information that provides or represents information for row numbers of data at each layer starting at the top of the tree. The string may be transmitted to the remote device when a field is updated or altered. In an instance in which the string is transmitted, the entire string must be transmitted. Additionally, as the remote device saves and updates the tree, the sorting and reloading of data on the webpage may alter the location of an item in the data tree and thus require the string to be amended by the webpage or the server. If the string is not updated, the result may be corruption of the data.

BRIEF SUMMARY OF SOME EXAMPLES OF THE INVENTION

Methods, apparatuses, and computer program products are herein provided for an address system that is configured to identify a table, a field and/or a row in a data structure. In some example embodiments, a field address number (FAN) and a New Row Key (NRK) are used to identify a table, row and/or field, such that a webpage operating on a client device and a data tree on a remote device may both be configured to identify the table, row and/or field by the FAN and NRK. In some example embodiments, the FAN and NRK may also be configured to identify a row and/or a field in an instance in which the row and/or field is created after the webpage is rendered and before the row and/or field has been added to the data tree structure.

In one embodiment, a method is provided that comprises receiving a request to modify a field of data. In some example embodiments, the field of data is identifiable by a received field key comprising a FAN and a NRK. The method of this embodiment may also include determining whether the field of data was rendered for display. The method of this embodiment may also include, in an instance in which the field of data was rendered for display, using the FAN of the received field key to locate an address object associated with the field of data. The method of this embodiment may also include, in an instance in which the field of data was not rendered for display, identifying a different FAN associated with the field of data by locating the received field key in a field key lookup map, and using the identified FAN to locate the address object associated with the field of data. The method of this embodiment may also include modifying the field of data using the located address object.

In another embodiment, an apparatus is provided that includes at least one processor and at least one memory including computer program code with the at least one memory and the computer program code being configured, with the at least one processor, to cause the apparatus to at least receive a request to modify a field of data. In some example embodiments, the field of data is identifiable by a received field key comprising a FAN and a NRK. The at least one memory and computer program code may also be configured to, with the at least one processor, cause the apparatus to determine whether the field of data was rendered for display. The at least one memory and computer program code may also be configured to, with the at least one processor, cause the apparatus to, in an instance in which the field of data was rendered for display, use the FAN of the received field key to locate an address object associated with the field of data. The at least one memory and computer program code may also be configured to, with the at least one processor, cause the apparatus to, in an instance in which the field of data was not rendered for display, identify a different FAN associated with the field of data by locating the received field key in a field key lookup map, and using the identified FAN to locate the address object associated with the field of data. The at least one memory and computer program code may also be configured to, with the at least one processor, cause the apparatus to modify the field of data using the located address object.

In the further embodiment, a computer program product may be provided that includes at least one non-transitory computer-readable storage medium having computer-readable program instructions stored therein with the computer-readable program instructions including program instructions configured to receive a request to modify a field of data. In some example embodiments, the field of data is identifiable by a received field key comprising a FAN and a NRK. The computer-readable program instructions may also include program instructions configured to determine whether the field of data was rendered for display. The computer-readable program instructions may also include program instructions configured to, in an instance in which the field of data was rendered for display, use the FAN of the received field key to locate an address object associated with the field of data. The computer-readable program instructions may also include program instructions configured to, in an instance in which the field of data was not rendered for display, identify a different FAN associated with the field of data by locating the received field key in a field key lookup map, and using the identified FAN to locate the address object associated with the field of data. The computer-readable program instructions may also include program instructions configured to modify the field of data using the located address object.

In yet another embodiment, an apparatus is provided that includes means for receiving a request to modify a field of data. In some example embodiments, the field of data is identifiable by a received field key comprising a FAN and a NRK. The apparatus of this embodiment may also include means for determining whether the field of data was rendered for display. The apparatus of this embodiment may also include, in an instance in which the field of data was rendered for display, means for using the FAN of the received field key to locate an address object associated with the field of data. The apparatus of this embodiment may also include, in an instance in which the field of data was not rendered for display, means for identifying a different FAN associated with the field of data by locating the received field key in a field key lookup map, and using the identified FAN to locate the address object associated with the field of data. The apparatus of this embodiment may also include means for modifying the field of data using the located address object. The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWINGS

Figure 1:
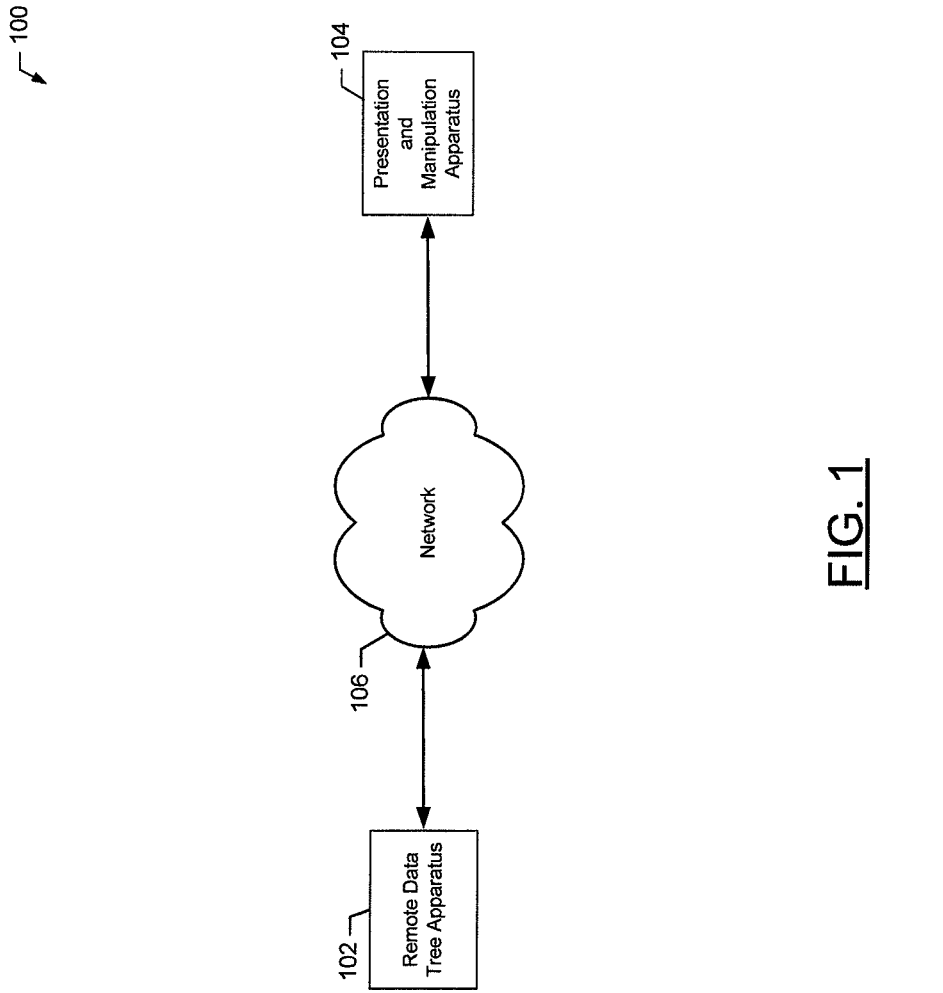
Figure 2:
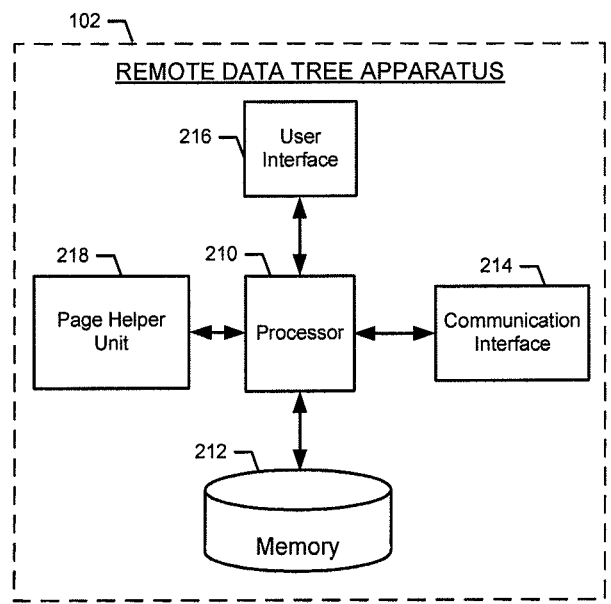
Figure 3:
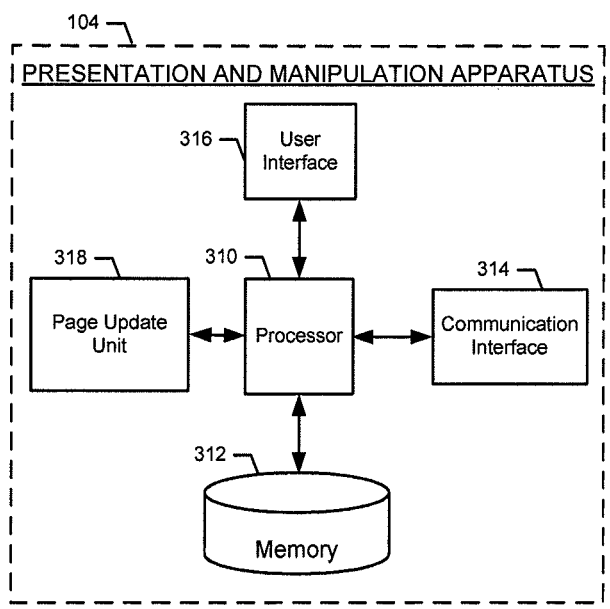
Figure 4:
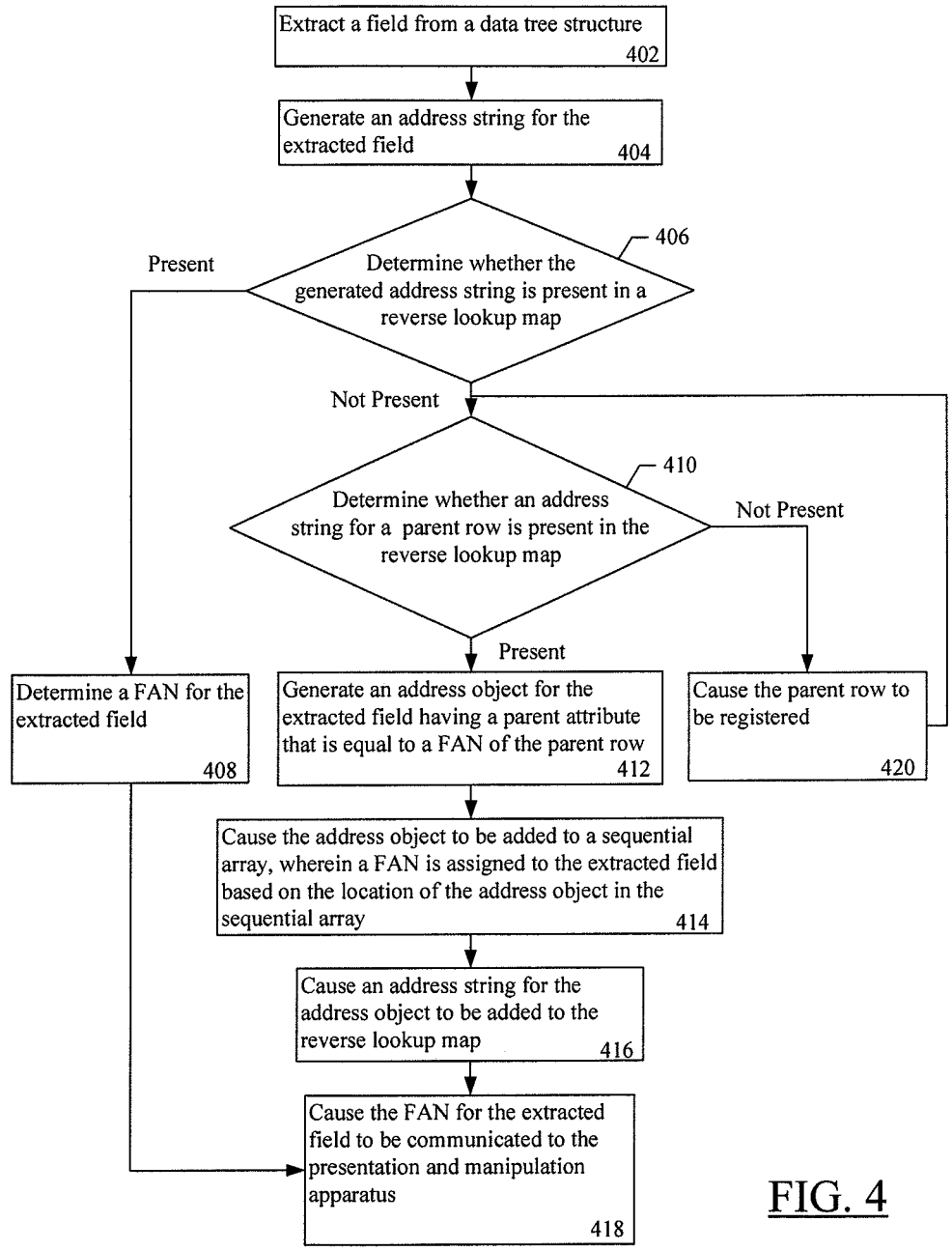
Figure 5A:
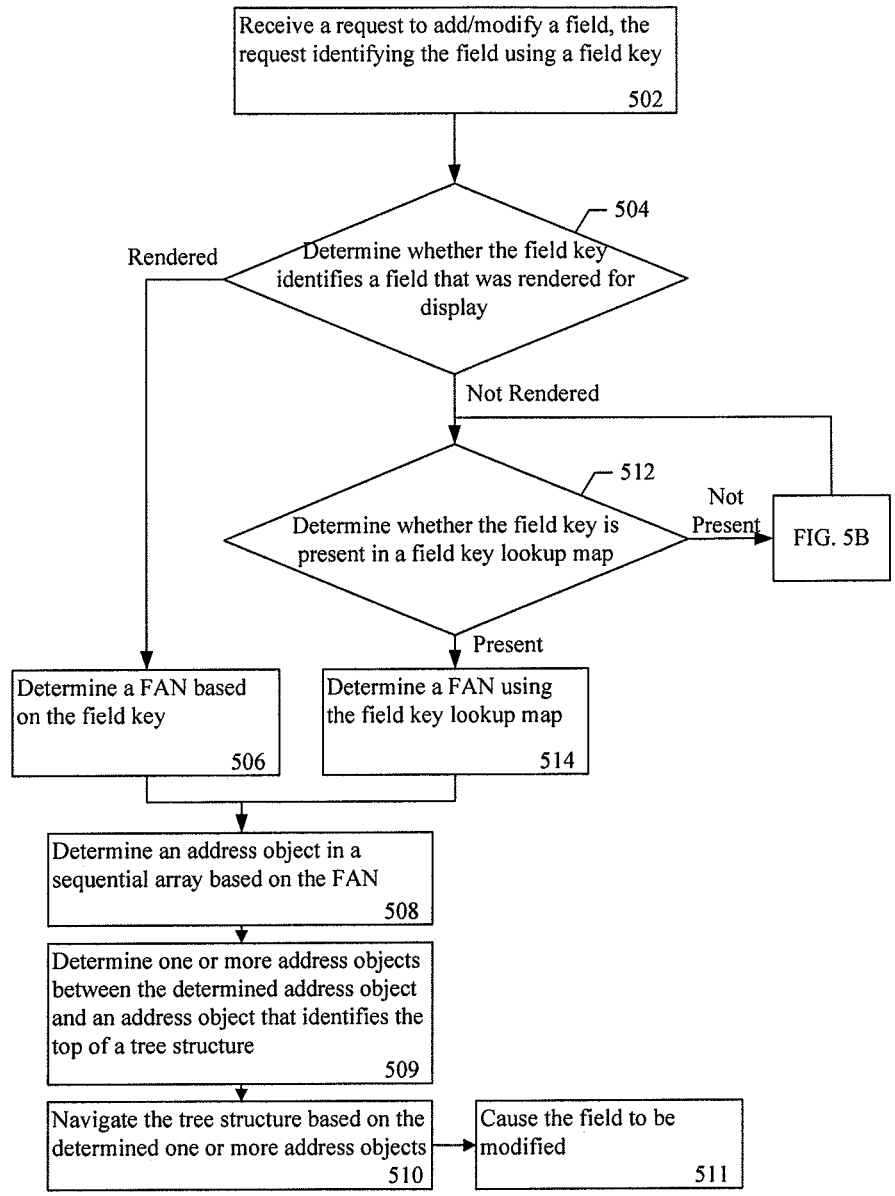
Figure 5B:
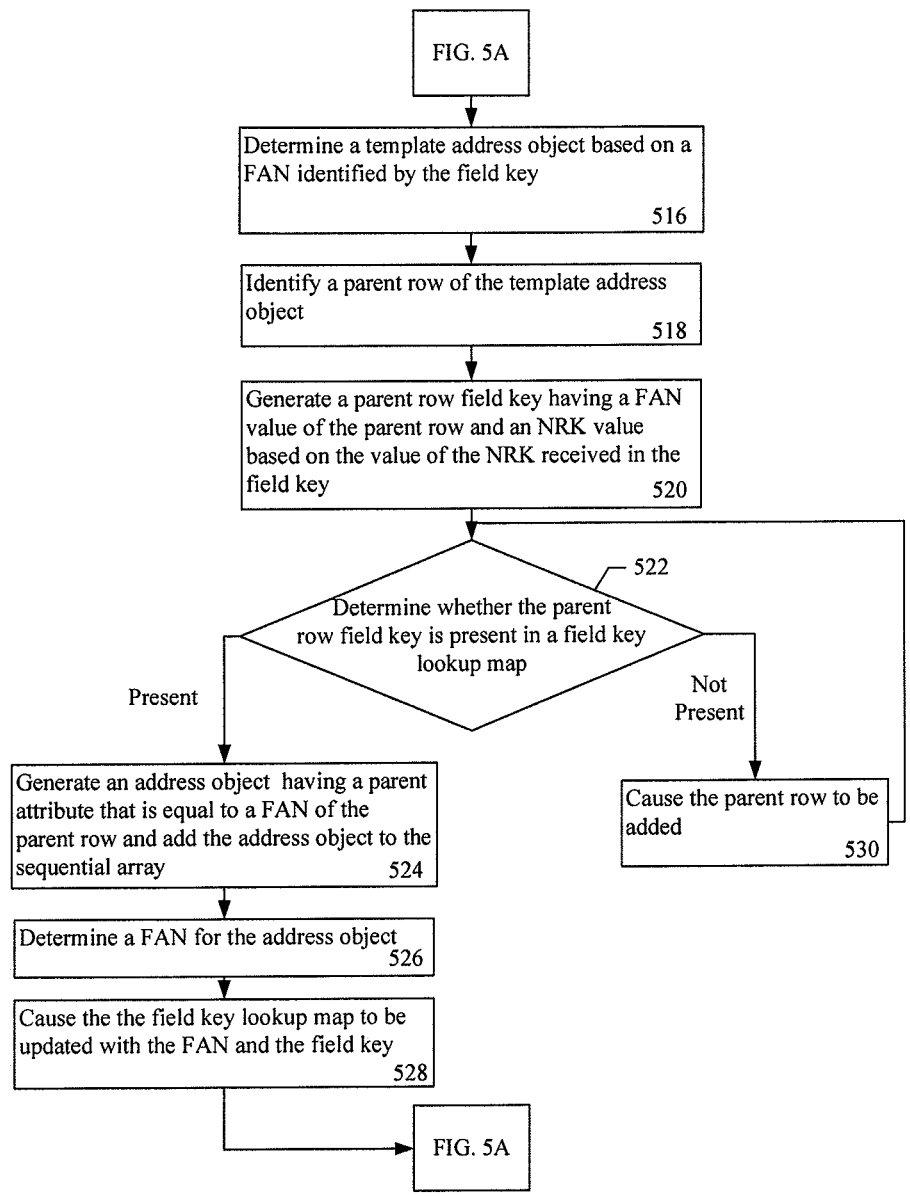
Figure 6:
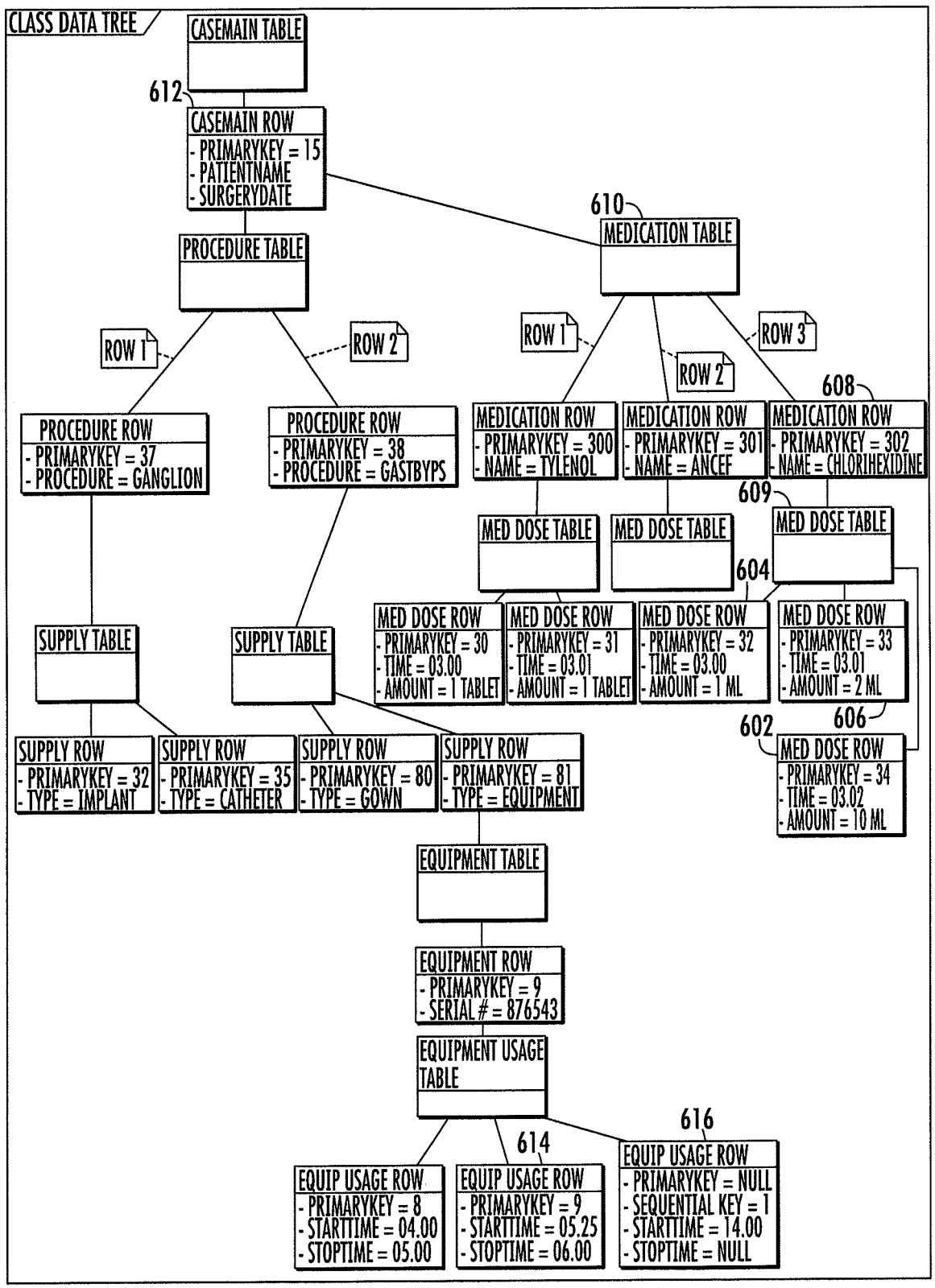
Figure 7:
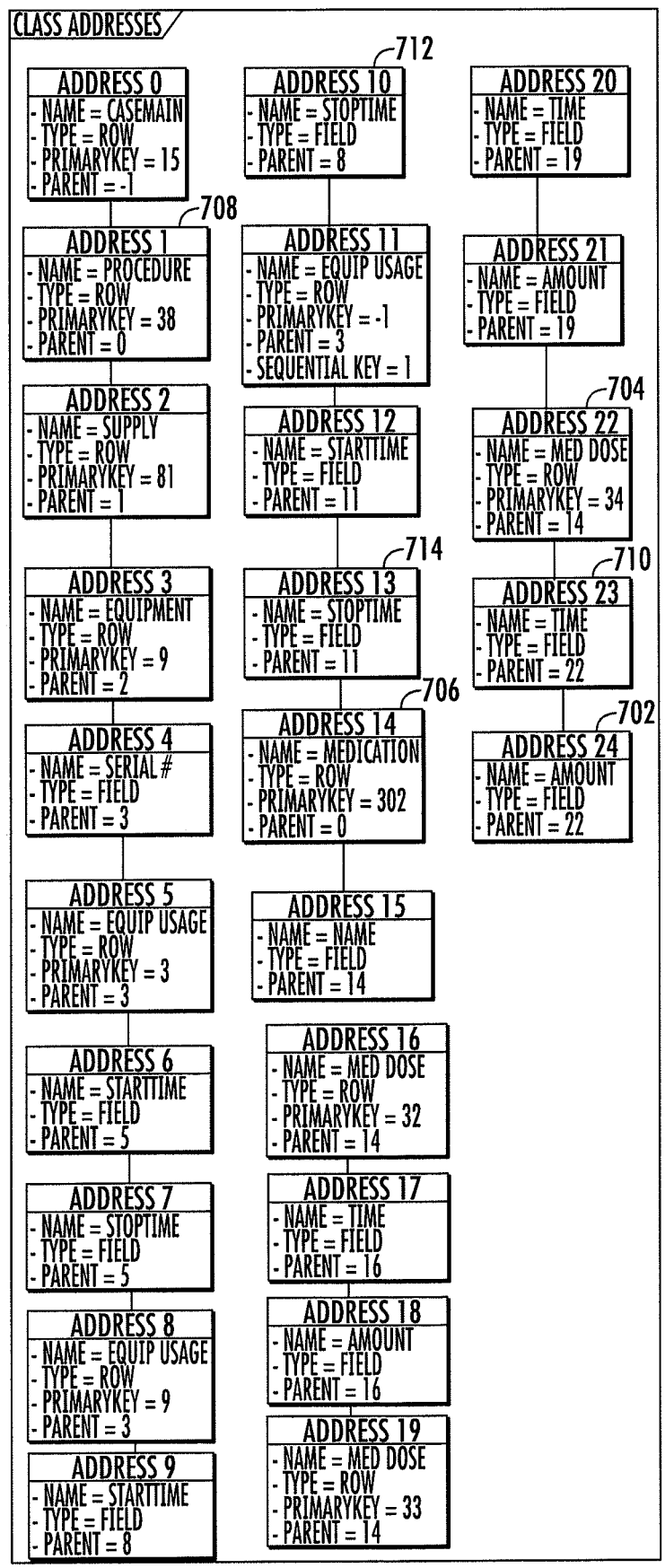

Having thus described embodiments of the invention in general terms, reference will now be made to the accompanying drawings, which are not necessarily drawn to scale, and wherein:

FIG. 1 illustrates a system for identifying a field in a data tree structure based on a FAN and a NRK according to some example embodiments;

FIG. 2 illustrates a block diagram of a presentation and manipulation apparatus according to some example embodiments;

FIG. 3 illustrates a block diagram of a remote data tree apparatus according to some example embodiments;

FIG. 4 illustrates a flow diagram according to an example process for rendering one or more fields in a data structure according to some example embodiments;

FIGS. 5A and 5B illustrate an example flow diagram for adding and/or modifying fields according to some example embodiments;

FIG. 6 illustrates an example data tree structure according to some example embodiments; and FIG. 7 illustrates an example sequential array configured to store one or more address objects according to some example embodiments.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, and/or the like.

FIG. 1 illustrates a system 100 for identifying a field in a data tree structure and/or on a rendered page according to some example embodiments. Some example embodiments described herein include a pair of numbers (FAN/NRK) that may be used to identify a single field quickly and efficiently when communicating between the client (e.g. a presentation and manipulation apparatus 104) and a server (e.g. a remote data tree apparatus 102). It will be appreciated that the system 100 as well as the illustrations in other figures are each provided as an example of some embodiments and should not be construed to narrow the scope or spirit of the disclosure in any way. In this regard, the scope of the disclosure encompasses many potential embodiments in addition to those illustrated and described herein. As such, while FIG. 1 illustrates one example of a configuration of system for identifying a field in a data tree and/or on a rendered page, numerous other configurations may also be used to implement embodiments of the present invention.

It will be appreciated that the entities illustrated in FIG. 1 are illustrated by way of example, and not by way of limitation. As such, it will be appreciated that one or more of the entities illustrated in FIG. 1 may be optional, or even eliminated, in some example embodiments. Further, in some example embodiments, the system 100 may include one or more other entities in addition to or in lieu of the entities illustrated in FIG. 1.

In some example embodiments, the system 100 may comprise a presentation and manipulation apparatus 104. The presentation and manipulation apparatus 104 may be embodied as any computing device or combination of a plurality of computing devices configured to for modifying a relational database based on one or more fields rendered on a viewable area. In this regard, by way of non-limiting example, the presentation and manipulation apparatus 104 may be embodied as one or more desktop computers, one or more laptop computers, one or more workstations, one or more network nodes, one or more servers, a server cluster, a cloud computing infrastructure, multiple computing devices in communication with each other, any combination thereof, and/or the like.

The presentation and manipulation apparatus 104 may be configured for modifying a relational database using a FAN and NRK and further communicate with one or more computing systems, such as, by way of example, one or more of a remote data tree apparatus 102 and/or the like over a network 106. The network 106 may comprise one or more wireless networks (e.g., a cellular network, wireless local area network, wireless metropolitan area network, and/or the like), one or more wireline networks (e.g., a wired local area network, a wired wide area network, and/or the like), or some combination thereof, and in some embodiments comprises at least a portion of the internet. As such, while the network 106 is illustrated as a single network, it will be appreciated that the network 106 may comprise a combination of one or more public networks, one or more private networks, or a combination thereof. Further, it will be appreciated that one or more dedicated communications links may be used to connect two or more entities within the system 100 in addition to or in lieu of the network 106. In embodiments wherein the network 106 comprises the internet, the system 100 may comprise a web-based system.

The remote data tree apparatus 102 may comprise one or more computing devices that may be implemented at a remote device and/or a plurality of remote devices. The remote data tree apparatus 102 may perform the function of a server. Additionally or alternatively, in some example embodiments, the remote data tree apparatus 102 may comprise a cloud-based system which may be accessed by the presentation and manipulation apparatus 104. While only a single remote data tree apparatus 102 is illustrated by way of example in FIG. 1, it will be appreciated that in some example embodiments, the system 100 may comprise a plurality of remote data tree apparatus 102. For example, each of a plurality of remote data tree apparatuses 102 may store a portion of the data and may be accessed for modifying the data tree structure by the presentation and manipulation apparatus 104.

Referring now to FIG. 2, FIG. 2 illustrates a block diagram of a remote data tree apparatus 102 for modifying a relational database using a FAN and NRK according to some example embodiments. In some example embodiments the remote data tree apparatus 102 includes various means for performing the various functions described herein. These means may include, for example, one or more of a processor 210, memory 212, communication interface 214, user interface 216, or page helper unit 218 for performing the various functions herein described. The means of the remote data tree apparatus 102 as described herein may be embodied as, for example, circuitry, hardware elements (e.g., a suitably programmed processor, combinational logic circuit, and/or the like), a computer program product comprising a computer-readable medium (e.g. memory 212) storing computer-readable program instructions (e.g., software or firmware) that are executable by a suitably configured processing device (e.g., the processor 210), or some combination thereof.

The processor 210 may, for example, be embodied as various means including one or more microprocessors, one or more coprocessors, one or more multi-core processors, one or more controllers, processing circuitry, one or more computers, various other processing elements including integrated circuits such as, for example, an ASIC (application specific integrated circuit) or FPGA (field programmable gate array) or some combination thereof. Accordingly, although illustrated in FIG. 2 as a single processor, in some embodiments the processor 210 may comprise a plurality of processors. The plurality of processors may be embodied on a single computing device or may be distributed across a plurality of computing devices collectively configured to function as the remote data tree apparatus 102. The plurality of processors may be in operative communication with each other and may be collectively configured to perform one or more functionalities of the remote data tree apparatus 102 as described herein. In some embodiments, the processor 210 may be configured to execute instructions stored in the memory 212 or otherwise accessible to the processor 210. These instructions, when executed by the processor 210, may cause the remote data tree apparatus 102 to perform one or more of the functionalities of the remote data tree apparatus 102 as described herein. As such, whether configured by hardware or software methods, or by a combination thereof, the processor 210 may comprise an entity capable of performing operations according to embodiments of the present invention while configured accordingly. Thus, for example, when the processor 210 is embodied as an ASIC, FPGA or the like, the processor 210 may comprise specifically configured hardware for conducting one or more operations described herein. Alternatively, as another example, when the processor 210 is embodied as an executor of instructions, such as may be stored in the memory 212, the instructions may specifically configure the processor 210 to perform one or more algorithms and operations described herein.

The memory 212 may include, for example, volatile and/or non-volatile memory. Although illustrated in FIG. 2 as a single memory, the memory 212 may comprise a plurality of memories. The plurality of memories may be embodied on a single computing device or distributed across a plurality of computing devices. The memory 212 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 212 may comprise any non-transitory computer readable storage medium. The memory 212 may be configured to store information, data, applications, instructions, and/or the like for enabling the remote data tree apparatus 102 to carry out various functions in accordance with example embodiments of the present invention. For example, in some example embodiments, the memory 212 is configured to buffer input data for processing by the processor 210. Additionally or alternatively, in some example embodiments, the memory 212 is configured to store program instructions for execution by the processor 210. The memory 212 may store information in the form of static and/or dynamic information. This stored information may be stored and/or used by the page helper unit 218 during the course of performing its functionalities.

In some example embodiments, the remote data tree apparatus 102 may include a communication interface(s), such as the communication interface 214. In embodiments including a communication interface, the communication interface 214 may be embodied as any device or means embodied in circuitry, hardware, a computer program product comprising a computer readable medium (e.g., the memory 212) storing computer readable program instructions executed by a processing device (e.g., the processor 210), or a combination thereof that is configured to receive and/or transmit data from/to another device with which remote data tree apparatus 102 may be in communication. In some example embodiments, the communication interface 214 is at least partially embodied as or otherwise controlled by the processor 210. In this regard, the communication interface 214 may be in communication with the processor 210, such as via a bus. The communication interface 214 may additionally be in communication with the memory 212, user interface 216, and/or page helper unit 218, such as via a bus(es). The communication interface 214 may include, for example, an antenna, a transmitter, a receiver, a transceiver and/or supporting hardware or software for enabling communications with another computing device. The communication interface 214 may be configured to receive and/or transmit data using any protocol that may be used for communications between computing devices. As an example, the communication interface 214 may be configured to receive and/or transmit data using any protocol and/or communications technology that may be used for communicating over a network, such as the network 106. Accordingly, the communication interface 214 may provide means for receiving and/or transmitting data to/from the remote presentation and manipulation apparatus 104 over the network 106.

In some example embodiments, the remote data tree apparatus 102 may include a user interface, such as the user interface 216. The user interface 216 may be in communication with the processor 210 to receive an indication of a user input and/or to provide an audible, visual, mechanical, or other output to a user. As such, the user interface 216 may include, for example, a keyboard, a mouse, a joystick, a display, a touch screen display, a microphone, a speaker, and/or other input/output mechanisms. The user interface 216 may be in communication with the memory 212, communication interface 214, and/or page helper unit 218, such as via a bus(es).

The page helper unit 218 may be embodied as various means, such as circuitry, hardware, a computer program product comprising a computer readable medium (e.g., the memory 212) storing computer readable program instructions executed by a processing device (e.g., the processor 210), or some combination thereof and, in some example embodiments, is embodied as or otherwise controlled by the processor 210. In embodiments wherein the page helper unit 218 is embodied separately from the processor 210, the page helper unit 218 may be in communication with the processor 210. The page helper unit 218 may further be in communication with one or more of the memory 212, communication interface 214, or user interface 216, such as via a bus(es).

In some example embodiments, the page helper unit 218 may be configured to extract, such as via the communications interface 214, at least one field of a plurality of fields that are stored in a data tree structure on a remote data tree apparatus 102. For example, the structure of the data tree may one that is modeled around the tables and rows of data in a relational database. For purposes of explanation and not to be used for purposes of limitation, a top node of the data tree and/or tree structure may be referred to as CaseMain. CaseMain may be embodied as a table and is configured to contain a single row according to some example embodiments. Other tables that may be present in the data structure may be children of CaseMain. By way of example, the data tree structure may comprise a number of tables and rows that may reference a number of layers (e.g. FIG. 6). Generally each row in the data tree structure is identified by a primary key. Alternatively or additionally a row may be identified by a sequential number in an instance in which the row has not yet been stored in the relational database. In some example embodiments, each row in the data tree structure may contain at least one field, the at least one field configured to contain an individual data element.

In some example embodiments, address information for a table row or field may be controlled by the page helper unit 218 in conjunction with an address object. In some example embodiments, the address objects are configured to represent a row in a table or an individual field. The address objects may be stored in a sequential array (e.g., the sequential array described with reference to FIG. 7) in the memory 212. The sequential array is configured to comprise a list of address object identifiable by a location identifier. For example, an address object may be accessed using the location identifier (e.g. the FAN) of the address object in the array.

In some example embodiments, an address object may comprise one or more attributes. For example, a first attribute may comprise an integer that identifies the address object in the sequential array. A second attribute may include an integer that contains the location in the sequential array of an address object that is the parent of the address object or provides context (e.g. defines a row for a particular field, related fields and/or the like) of the address. For example, the second attribute for a field address may have an integer that designates a row address, whereas the second attribute of the row address may identifies its parent row. Alternatively or additionally, a row at the top of the tree structure indicate with the second attribute that it is at the top of the structure using a predefined value (e.g. −1).

In some example embodiments, a row address may contain one or more attributes. For example a row that is already stored in the relational database that is represented by the data tree structure, may contain an attribute that is defined as a primary key. However, in an instance in which a new row is created, such as by a user or by a system function, the primary key may be null if it has not yet been stored in the relational database. Thus in such a case, the processor 210, the page helper unit 218 or the like may assign the new row a unique sequential number. Each time a new unsaved row is encountered, a unique number is generated by the page helper unit 218 in order to provide identification information for the new row until it is stored in the relational database. A third attribute may be included in an address object that contains the name of the address. For example for a row address, the third attribute contains the name of the related table or in the case of a field, the third attribute identifies the name of the field.

In some example embodiments the page helper unit 218 may further be configured to generate and/or store a field key in a field key address lookup map. The field key comprises a FAN and NRK that identifies a row or field on the webpage displayed in the viewable area of the user interface 216 and may also be stored in memory 212. Alternatively or additionally, a map FAN and NRK combination may be assigned to a field or row after the webpage has been created. The field key address lookup map may further be configured to map a FAN and NRK combination to an address object stored in the sequential array.

Alternatively or additionally, the page helper unit 218 may be configured to create, modify and/or update a reverse lookup map. The reverse lookup map, according to some example embodiments, stores at least a portion of the address object in the form of an address string and then maps that address string to the location of the address object in the sequential array. The reverse lookup map may be stored in the memory 212. The reverse lookup map is further configured to use a table name and a row address/field address to ensure that each field and/or row is only assigned a single address object. If an address object is registered (e.g. stored) in the reverse lookup map the reverse lookup map is further configured to return the FAN.

In some example embodiments, the reverse lookup map may contain an address string that includes a TableName and a PrimaryKey for a row that is currently stored in the relational database. A TableName and a SequentialKey may be stored as an address string in the reverse lookup map for a row that has been created but not yet stored in the relational database. A TableName, PrimaryKey and FieldName may be stored as an address string in the reverse lookup map for a field in a row that is currently stored in a relational database. A TableName, a SequentialKey and a FieldName may be stored as an address string in the reverse lookup map for a field in a row that has been created but not yet stored in the relational database.

In some example embodiments, the page helper unit 218 may receive a request for a field to be updated in the data tree structure and ultimately the relational database, such as via the communications interface 314, from the presentation and manipulation apparatus 104. Once the request is received, the page helper unit 218 may be configured to extract the FAN and NRK for the field that has been requested to be updated. The page helper unit 218 may then determine whether the FAN is a valid address number. In some cases, if the NRK value is set to a predetermined value, then the FAN may signify the field address.

In embodiments where the NRK is not set to the predetermined value, then the page helper unit 218 may be configured to determine whether the reverse lookup map contains the NRK and FAN combination to see if the field has already been registered. If so, then the address object for the field to include the field address may be retrieved from the reverse lookup map. However if the NRK and the FAN combination are not already registered (e.g. the field is a new field), then the page helper unit 218 may use the address object that matches the FAN value as a template for the new field.

In some example embodiments, the page helper unit 218 may be configured to use the received field address and the NRK to determine whether the row (e.g. the template row) related to the received field address has been registered. If the row has been registered, then the field may be located within the row and then registered in the reverse lookup map by the page helper unit 218. If the row has not been registered then the page helper unit 218 may determine a template row that was used to create the row that has not been registered. Based on the template row, the new row may be added to the tree structure and the new row may be given a sequential key. The new or updated field may then be registered once the row has been registered, such as by the page helper unit 218.

Alternatively or additionally, as the webpage is being rendered for presentation and manipulation apparatus 104, the page helper unit 218 may access rows and/or fields extracted from the remote data tree apparatus 102. The page helper unit 218 may further be configured to cause the extracted fields to be registered in at least one of the reverse lookup map and/or the field key address lookup map. In some example embodiments, the page helper unit 218 is configured to register the received fields by causing a FAN to be created for a field.

In some example embodiments, the page helper unit 218 may be configured to determine whether the extracted field has been registered by referencing the reverse lookup map. In an instance in which the field has been registered, the page helper unit 218 may receive a FAN from the reverse lookup map. In an instance in which the field is not registered, the page helper unit 218 registers the row that the field is associated with in the reverse lookup map, and then creates a field address for the field. Once the field address is created, the page helper unit 218 may populate the reverse lookup map and an address object in the sequential array. In some example embodiments, the page helper unit 218 may then create an address object in the sequential array and receive a FAN from it. As described herein, the FAN signifies the position of the address object in the sequential array (see e.g. FIG. 7).

In an instance in which a row is registered, the page helper unit 218 determines the row address from the reverse lookup map. Otherwise, a row address may be created for the new row by the page helper unit 218 and added to the sequential array. The parent row of the tree node holding the row may then be registered by the page helper unit 218 to provide the parent identification for the row address. In an instance in which a row is new and does not have a sequential key to identify it, the page helper unit 218 may be configured to assign a sequential key to the new row.

Once a field has been registered in a reverse lookup map, such as by the processor 310, the page helper unit 218 or the like, the field may then be located within the data tree structure that is stored in the memory 312 so that the actual field may be updated in the relational database. In some example embodiments, the processor 310, the address object or the like may be configured to recursively follow the parent attribute in the address object for each field and row to the top of the tree structure (e.g. CaseMain). For example, a FAN may be used to identify an address object and as described herein, the field address identifies a FAN for the parent row address Each row identifies a FAN for a parent row address and each row address may be followed through its parent until the top of the tree structure is identified. Once at the top of the tree, the processor 310, the page helper unit 218 or the like, uses the row address name to identify a child node and a row identifier to locate which row in the child node to use. After stepping down the tree the field may be identified in the tree structure and in the relational database and updated.

In some example embodiments, after a save is performed, the rows and fields may be added and/or stored within the tree structure. However, unless the viewable area on the presentation and manipulation apparatus 104 is refreshed, the presentation and manipulation apparatus 104 may not be configured to identify the rows and fields using a registered field address and therefore the page helper unit 218 may be configured to refer to those rows and fields using the FAN and NRK combination. At the time of the save, the page helper unit 218 may assign a primary key and remove any sequential keys.

Referring now to FIG. 3, FIG. 3 illustrates a block diagram of a presentation and manipulation apparatus 104 for rendering and/or displaying at least one field on a viewable area according to some example embodiments. In some example embodiments the presentation and manipulation apparatus 104 includes various means for performing the various functions described herein. These means may include, for example, one or more of a processor 310, memory 312, communication interface 314, user interface 316, or page update unit 318 for performing the various functions herein described. The means of the presentation and manipulation apparatus 104 as described herein may be embodied as, for example, circuitry, hardware elements (e.g., a suitably programmed processor, combinational logic circuit, and/or the like), a computer program product comprising a computer-readable medium (e.g. memory 312) storing computer-readable program instructions (e.g., software or firmware) that are executable by a suitably configured processing device (e.g., the processor 310), or some combination thereof.

The processor 310 may, for example, be embodied as various means including one or more microprocessors, one or more coprocessors, one or more multi-core processors, one or more controllers, processing circuitry, one or more computers, various other processing elements including integrated circuits such as, for example, an ASIC or FPGA, or some combination thereof. Accordingly, although illustrated in FIG. 3 as a single processor, in some embodiments the processor 310 may comprise a plurality of processors. The plurality of processors may be embodied on a single computing device or may be distributed across a plurality of computing devices collectively configured to function as the presentation and manipulation apparatus 104. The plurality of processors may be in operative communication with each other and may be collectively configured to perform one or more functionalities of the presentation and manipulation apparatus 104 as described herein. In some embodiments, the processor 310 may be configured to execute instructions stored in the memory 312 or otherwise accessible to the processor 310. These instructions, when executed by the processor 310, may cause the presentation and manipulation apparatus 104 to perform one or more of the functionalities of the presentation and manipulation apparatus 104 as described herein. As such, whether configured by hardware or software methods, or by a combination thereof, the processor 310 may comprise an entity capable of performing operations according to embodiments of the present invention while configured accordingly. Thus, for example, when the processor 310 is embodied as an ASIC, FPGA or the like, the processor 310 may comprise specifically configured hardware for conducting one or more operations described herein. Alternatively, as another example, when the processor 310 is embodied as an executor of instructions, such as may be stored in the memory 312, the instructions may specifically configure the processor 310 to perform one or more algorithms and operations described herein.

The memory 312 may include, for example, volatile and/or non-volatile memory. Although illustrated in FIG. 1 as a single memory, the memory 312 may comprise a plurality of memories. The plurality of memories may be embodied on a single computing device or distributed across a plurality of computing devices. The memory 312 may comprise, for example, a hard disk, random access memory, cache memory, flash memory, an optical disc (e.g., a CD-ROM, DVD-ROM, or the like), circuitry configured to store information, or some combination thereof. In this regard, the memory 312 may comprise any non-transitory computer readable storage medium. The memory 312 may be configured to store information, data, applications, instructions, and/or the like for enabling the presentation and manipulation apparatus 104 to carry out various functions in accordance with example embodiments of the present invention. For example, in some example embodiments, the memory 312 is configured to buffer input data for processing by the processor 310. Additionally or alternatively, in some example embodiments, the memory 312 is configured to store program instructions for execution by the processor 310. The memory 312 may store information in the form of static and/or dynamic information. This stored information may be stored and/or used by the page update unit 318 during the course of performing its functionalities.

In some example embodiments, the presentation and manipulation apparatus 104 may include a communication interface(s), such as the communication interface 314. In embodiments including a communication interface, the communication interface 314 may be embodied as any device or means embodied in circuitry, hardware, a computer program product comprising a computer readable medium (e.g., the memory 312) storing computer readable program instructions executed by a processing device (e.g., the processor 310), or a combination thereof that is configured to receive and/or transmit data from/to another device with which the presentation and manipulation apparatus 104 may be in communication. In some example embodiments, the communication interface 314 is at least partially embodied as or otherwise controlled by the processor 310. In this regard, the communication interface 314 may be in communication with the processor 310, such as via a bus. The communication interface 314 may additionally be in communication with the memory 312, user interface 316, and/or page update unit 318, such as via a bus(es). The communication interface 314 may include, for example, an antenna, a transmitter, a receiver, a transceiver and/or supporting hardware or software for enabling communications with another computing device. The communication interface 314 may be configured to receive and/or transmit data using any protocol that may be used for communications between computing devices. As an example, the communication interface 314 may be configured to receive and/or transmit data using any protocol and/or communications technology that may be used for communicating over a network, such as the network 106. Accordingly, the communication interface 314 may provide means for receiving and/or transmitting data to/from the remote data tree apparatus 102 over the network 106.

In some example embodiments, the presentation and manipulation apparatus 104 may include a user interface, such as the user interface 316. The user interface 316 may be in communication with the processor 310 to receive an indication of a user input and/or to provide an audible, visual, mechanical, or other output to a user. As such, the user interface 316 may include, for example, a keyboard, a mouse, a joystick, a display, a touch screen display, a microphone, a speaker, and/or other input/output mechanisms. The user interface 316 may be in communication with the memory 312, communication interface 314, and/or page update unit 318, such as via a bus(es).

The page update unit 318 may be embodied as various means, such as circuitry, hardware, a computer program product comprising a computer readable medium (e.g., the memory 312) storing computer readable program instructions executed by a processing device (e.g., the processor 310), or some combination thereof and, in some example embodiments, is embodied as or otherwise controlled by the processor 310. In embodiments wherein the page update unit 318 is embodied separately from the processor 310, the page update unit 318 may be in communication with the processor 310. The page update unit 318 may further be in communication with one or more of the memory 312, communication interface 314, or user interface 316, such as via a bus(es).

In some example embodiments, the page update unit 318 is configured to render one or more rows and/or fields from the data tree structure in the remote data tree apparatus 102 for display on the viewable area of the user interface 316. The page update unit 318 is further configured to identify each of the rows and/or fields with a FAN and NRK.

In some example embodiments, a user interacting with a viewable area on a user interface 316 may request to add a new row to the remote tree structure and the relational database without refreshing the viewable area (e.g. causing a remote procedure call (RPC) with the remote data tree apparatus 102). The new row may be created based on a preexisting template row in the viewable area. When a new row and/or a new field is added, the user interface 316, the page update unit 318 and/or the like may be configured to assign a new NRK to the new row. The fields for the new row may then be based on the fields in the template row and are assigned the same FAN as the fields in the template row by the page update unit 318. Thus all new fields within the same row will have the new NRK value and will have the same FAN as those fields in the template row. In some example embodiments, a request for updating the fields and/or rows will comprise a FAN and NRK for the identified fields and/or rows.

Referring now to FIG. 4, FIG. 4 illustrates a flow diagram according to an example process for rendering one or more fields in a data structure for display on a device, such as the presentation and manipulation apparatus 104, according to some example embodiments. In this regard, FIG. 4 illustrates a method that may be at least partially performed by a remote data tree apparatus 102. The operations illustrated in and described with respect to FIG. 4 may, for example, be performed by, with the assistance of, and/or under the control of one or more of the processor 210, memory 212, communication interface 214, user interface 216, or page helper unit 218.

In some example embodiments, a field is extracted, such as by the processor 210, the page helper unit 218 and/or the like, from a data tree structure at operation 402. An address string is then generated for the extracted field at operation 404. The address string is configured to identify the extracted field in the data tree structure. The address string is then compared to one or more address strings present in a reverse lookup map. The reverse lookup map configured to map the address string to an address object in a sequential array, the address object identifiable in the sequential array by a FAN. At decision block 406, it is determined, such as by the processor 210, the page helper unit 218 and/or the like, whether the generated address string is present in a reverse lookup map. If the generated address string is present in the reverse lookup map then the reverse lookup map is used to determine a FAN for the extracted field at operation 408. The FAN for the extracted field is passed to the presentation and manipulation apparatus at operation 418.

If, at decision block 406, it is determined that the generated address string is not present in the reverse lookup map, then at decision operation 410 it is determined, such as by the processor 210, the page helper unit 218 and/or the like, whether an address string for a parent row is present in the reverse lookup map. The parent row being defined as the parent to the extracted field. If the parent row is present in the reverse lookup map, then at operation 412, the processor 210, the page helper unit 218 and/or the like, generates an address object for the extracted field having a parent attribute that is equal to a determined FAN of the parent row. The parent attribute is an attribute that is defined by the address object. At operation 414, the address object is added to a sequential array and the FAN is assigned to the extracted field based on the location of the address object in the sequential array at operation 416. The address string for the address object is then added to the reverse lookup map so as to allow it be identified in the future. The FAN for the extracted field is passed to the presentation and manipulation apparatus at operation 418.

If at decision operation 410 it is determined that the parent row is not present in the reverse lookup map, then the processor 210, the page helper unit 218 and/or the like is configured to register the parent row. In order to register the parent row, the processor 210, the page helper unit 218 and/or the like determines whether an address string for a parent of the parent row is present in the reverse lookup map. If the parent is present, then an address object is created for the parent row, the address object having a parent attribute equal to a FAN of the parent. The processor 210, the page helper unit 218 and/or the like are further configured to recursively search the tree structure to determine any parent (e.g. grandparent, great grandparent) that is registered in the reverse lookup map. Once a parent is determined, then the processor 210, the page helper unit 218 and/or the like may traverse the tree structure causing address objects to be created in the sequential array until the address object for the parent row is created, each address object created having a parent attribute that is equal to the FAN of the parent. Once the parent row has been created the process returns to decision operation 410.

FIGS. 5A and 5B illustrate a flowchart for adding and/or modifying fields according to some example embodiments. In this regard, FIGS. 5A and 5B illustrate a method that may be at least partially performed by a remote data tree apparatus 102. The operations illustrated in and described with respect to FIGS. 5A and 5B may, for example, be performed by, with the assistance of, and/or under the control of one or more of the processor 210, memory 212, communication interface 214, user interface 216, or page helper unit 218.

In some example embodiments, a request may be received from the presentation and manipulation apparatus 104 at operation 502, wherein the request identifies a field to be added or modified. The request is configured to identify the field using a received field key. In some example embodiments, the received field key comprises a FAN and an NRK as defined by the presentation and manipulation apparatus 104. As will be readily understood, the FAN defined by the presentation and manipulation apparatus 104 may differ from the FAN defined by the sequential array, thus a field key lookup table is configured to map the received field key to the FAN that is defined by the sequential array.

In an instance in which a field was rendered for display (see e.g. FIG. 4), then the FAN in the received field key will match the FAN that is defined by the sequential array. However in an instance in which the field was added by a user of the presentation and manipulation apparatus 104 after rendering or if a request is a request to add a new field, then the FAN in the received field key will not match the FAN defined by the address object in the sequential array. Thus, as shown with respect to decision operation 504, the processor 210, the page helper unit 218 and/or the like determines whether the field key identifies a field that was rendered for display. In some example embodiments, an NRK value in the received field key that is set to a predetermined value (e.g. −1) signifies to the page helper unit 218 that the field was rendered for display and thus the page helper unit 218 knows that the received FAN matches the FAN defined by the sequential array. Any other value in the NRK signifies that the field was not rendered for display.

If the field was rendered for display, then at operation 506, the FAN is determined based on the received field key. Using this FAN, the processor 210, the page helper unit 218 and/or the like determines the location of the address object in the sequential array at operation 508. At operation 509, the processor 210, the page helper unit 218 and/or the like determines the one or more address objects between the determined address object (e.g. determined in operation 508) and an address object that identifies the top of a data tree structure (e.g. CaseMain). Once the top of the tree structure is located, then, in operation 510, the processor 210, the page helper unit 218 and/or the like navigates through the tree structure to locate the requested field of data. The located field is then caused to be modified in the tree structure based on the located address object at operation 511. In some example embodiments, when navigating through the data tree structure, the processor 210, the page helper unit 218 and/or the like may determine that a row that was identified in the sequential array by an address object is not located in the tree structure. In such cases, the processor 210, the page helper unit 218 and/or the like may cause the missing row to be added to the tree structure based on its address object.

If the field was not rendered for display, then at decision operation 512, the processor 210, the page helper unit 218 and/or the like determines whether the field key is present in a field key lookup map. As described above, if the field already has a related address object in the sequential array, then the received field key will be present in the field key lookup map. If the field key is present in the field key lookup map, then at operation 514, the FAN of the address object is determined using the field key lookup map. Using this FAN (i.e., the FAN mapped to the field key in the field key lookup map), the processor 210, the page helper unit 218 and/or the like determines the location of the address object in the sequential array at operation 508. At operation 509, the processor 210, the page helper unit 218 and/or the like determines the one or more address objects between the determined address object (e.g. determined in operation 508) and an address object that identifies the top of a data tree structure (e.g. CaseMain). Once the top of the tree structure is located, then, in operation 510, the processor 210, the page helper unit 218 and/or the like navigates through the tree structure to locate the requested field of data. The located field is then caused to be modified in the tree structure based on the located address object at operation 511.

If the field key is not present in the field key lookup map (i.e., if the request is for a new field), then as is shown with respect to FIG. 5B, at operation 516 a template address object is determined based on the FAN identified by the field key. The processor 210, the page helper unit 218 and/or the like may then identify a parent row of the template address object at operation 518. A parent row field key is then generated at operation 520, the parent row field key having a FAN value of the parent row and an NRK value equal to the value of the NRK received in the field key. This field key value is configured to identify the parent row of the field.

If the parent row field key is not present in the field key lookup map, then at operation 530, the processor 210, the page helper unit 218 and/or the like causes the parent row to be added. The parent row is added by determining a row used as a template for creating the parent row. An address object is then added to the sequential array identifying the parent row and having a parent attribute equal to the parent attribute of the row used as the template. For example, both the parent row and the template row would have the same parent (e.g. such as a parent table as shown in FIG. 6). The FAN for the parent row is determined based on the location of the address object in the sequential array. Once the FAN for the parent is determined it is added to the field key lookup map and the operation returns to decision operation 522.

If the parent row field key is not present in the field key lookup map, then at operation 530, the processor 210, the page helper unit 218 and/or the like causes the parent row to be added. The parent row is added by determining a FAN for a row used as a template for creating the parent row (e.g., its parent). An address object is then added to the sequential array identifying the parent row and having a parent attribute equal to the FAN of the row used as the template. The FAN for the parent row is determined based on the location of the address object in the sequential array. Once the FAN for the parent is determined it is added to the field key lookup map and the operation returns to decision operation 522.

FIGS. 4 and 5 illustrate flowcharts of a system, method, and computer program product according to example embodiments of the invention. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a server, desktop computer, laptop computer, mobile computer, or other computing device (e.g., an presentation and manipulation apparatus 104) and executed by a processor (e.g., the processor 210) in the computing device. In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowcharts' block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowcharts' block(s). The computer program instructions of one or more computer program products may also be loaded onto a computer or other programmable apparatus to cause a series of operations to be performed on the computer or other programmable apparatus to produce a computer-implemented process such that the instructions which execute on the computer or other programmable apparatus implement the functions specified in the flowcharts' block(s).

Accordingly, blocks or steps of the flowcharts support combinations of means for performing the specified functions and combinations of steps for performing the specified functions. It will also be understood that one or more blocks of the flowcharts, and combinations of blocks in the flowcharts, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

FIG. 6 illustrates an example data tree structure according to some example embodiments of the current invention. A data tree structure may comprise a number of tables, having rows and fields stored therein. For example as shown in FIG. 6 a medication table 610 may contain one or more medication rows, such as medication row 608. In the example data tree structure shown in FIG. 6, the medication row 608 may describe a particular medication. As illustrated with respect to the medication table 610, the medication table has three child rows and has a parent row that is identified as Case-Main 612. The medication row 608 has a child table referred to as the med dose table 609 which is configured, in this example, to provide information related to a dose of a medication. The med dose table 609 comprises three med dose rows 602, 604 and 606. In some example embodiments, a med dose row 602 may comprise a primary key, and fields such as but not limited to a time field and an amount field.

FIG. 7 illustrates an example sequential array configured to store one or more address objects according to some example embodiments of the current invention. By way of example each field and row may comprise a FAN, for example address 24 indicating a FAN of 24 is shown by reference number 702. As described herein, the FAN is used by the page helper unit 218 to locate the address object of the field in the sequential array and then eventually in the tree structure (e.g. based on the primary key). Address 24 represents the amount field as shown with respect to med dose row 602 of FIG. 6. Alternatively or additionally, the time field of med dose row 602 is shown with respect to Address 23 (box 710). Address 24 comprises a field name attribute (e.g. amount), a type attribute (e.g. a field) and a parent address number (e.g. 22) that identifies that the parent row is located in Address 22 represented by Box 704. The address object at Address 22 represents a row with a primary key of 34 and identifies that its parent row has an address of 14. Address 22 describes a row and comprises a field name attribute (e.g. Med Dose), a type attribute (e.g. Row), a primary key value (e.g. 34) and a parent address number (e.g. 14). Address 22 represents med dose row 602 of FIG. 6. Address 14 (box 706) corresponds with the medication row 608 of FIG. 6. Finally, as is shown with respect to box 708, the parent row is 0 or the CaseMain row 612 of FIG. 6 signifying the top of the tree.

By way of example and referring to FIGS. 6 and 7, in an instance in which a user is interacting with a viewable area and selects to a add a new row, row 616, based on equip usage row 614, row 614 is used as a template for the creation of new row 616. For example, the fields of new row 616 would have the same FAN as the corresponding fields of 614, however the fields of new row 616 would be given a unique NRK signifying that a new row has been added. For example, the stop time field of row 614 has a FAN of 10 in FIG. 7 (712) and thus the stop time field of the new row 616 would also initially have a FAN of 10, but would be assigned an NRK of 0 to signify that the stop time field belongs to a new row. The FAN and NRK may then be transmitted to the server. The server, such as the data tree apparatus 102, may then determine whether a FAN of 10 and a NRK of 0 is present in the field key address lookup map. Because the FAN and NRK combination describe a field in a new row, the FAN and NRK will not be in the field key address lookup map. In such a case, the server may then be configured to update the sequential array to include a new address object for the new row 616 and the stop time field (see e.g. box 714 of FIG. 7), the stop time field using the address object located at FAN 10 as a template. A FAN of 13 is assigned to the address object that identifies the stop time field of new row 616. The server may then register the stop time field in the field key lookup map. In future modification requests, the same FAN/NRK combination may be transmitted to the server. In response the server is configured to utilize the field key lookup map to identify the assigned FAN of the address object in the sequential array.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method executed at a server computing device that is in network communication with a client computing device, the method comprising:
   receiving, from the client computing device, a request to modify a field of data in a data tree stored at the server computing device, wherein the field of data is identifiable in the data tree by a field key received from the client computing device, wherein the field key comprises a field address number (FAN) and a new row key (NRK);
   based upon a value of the NRK, determining whether the field of data was rendered for display at the client computing device;
   when the value of the NRK indicates that the field of data was rendered for display at the client computing device, locating an address object in a sequential array based upon the FAN of the field key, wherein the address object comprises a first integer that identifies the address object in the sequential array and a second integer that identifies a parent address object of the address object, wherein the address object is usable to locate the field of data in the data tree;
   when the value of the NRK indicates that the field of data was not rendered for display:
      locating an entry for the field key in a field key lookup map, wherein a second FAN is mapped to the entry for the field key in the field key lookup map; and
      locating the address object in the sequential array based upon the second FAN; and
   locating the field of data in the data tree based upon the address object; and
   responsive to locating the field of data in the data tree, modifying the field of data in the data tree in accordance with the request received from the client computing device,
   wherein the modified field of data in the data tree is subsequently caused by the server computing device to be displayed on display.

2. The method of claim 1 further comprising:
   when the value of the NRK indicates that the field of data was not rendered for display, prior to locating the entry for the field key in the field key lookup map, determining a template address object based upon the FAN of the field key;
determining a parent row of the template address object; and
generate a parent row field key for the parent row based upon the parent row and the NRK.

3. The method of claim 1 further comprising:
prior to receiving the request to modify the field of data in the data tree, receiving a request to add the field of data to the data tree from the client computing device; and
responsive to receiving the request to modify the field of data in the data tree, assigning the NRK to the field of data.

4. The method of claim 1, wherein the data tree comprises a plurality of tables and a plurality of rows that reference a number of layers within the data tree.

5. The method of claim 1, wherein locating the field of data in the data tree based upon the address object comprises:
determining one or more address objects between the address object and a second address object identifying a top of the data tree; and
navigating the data tree based upon the one more address objects.

6. The method of claim 1, wherein an address object for a top of the data tree has a predefined value indicating that the address object corresponds to the top of the data tree.

7. A server computing device that is in network communication with a client computing device, the server computing device comprising:
a processor; and
memory storing instructions, wherein the instructions, when executed by the processor, are configured to perform acts comprising:
receiving, from the client computing device, a request to modify a field of data in a data tree stored at the server computing device, wherein the field of data is identifiable in the data tree by a field key received from the client computing device, wherein the field key comprises a field address number (FAN) and a new row key (NRK);
based upon a value of the NRK, determining whether the field of data was rendered for display at the client computing device;
when the value of the NRK indicates that the field of data was rendered for display at the client computing device, locating an address object in a sequential array based upon the FAN of the field key, wherein the address object comprises a first integer that identifies the address object in the sequential array and a second integer that identifies a parent address object of the address object, wherein the address object is usable to locate the field of data in the data tree;
when the value of the NRK indicates that the field of data was not rendered for display:
locating an entry for the field key in a field key lookup map, wherein a second FAN is mapped to the entry for the field key in the field key lookup map; and
locating the address object in the sequential array based upon the second FAN; and
locating the field of data in the data tree based upon the address object; and
responsive to locating the field of data in the data tree, modifying the field of data in the data tree in accordance with the request received from the client computing device,
wherein the modified field of data in the data tree is subsequently caused by the server computing device to be displayed on display.

8. The server computing device of claim 7, the acts further comprising:
when the value of the NRK indicates that the field of data was not rendered for display, prior to locating the entry for the field key in the field key lookup map, determining a template address object based upon the FAN of the field key.

9. The server computing device of claim 7, the acts further comprising:
prior to receiving the request to modify the field of data in the data tree, receiving a request to add the field of data to the data tree from the client computing device; and
responsive to receiving the request to modify the field of data in the data tree, assigning the NRK to the field of data.

10. The server computing device of claim 7, wherein the data tree comprises a plurality of tables and a plurality of rows that reference a number of layers within the data tree.

11. The server computing device of claim 7, wherein locating the field of data in the data tree based upon the address object comprises:
determining one or more address objects between the address object and a second address object identifying a top of the data tree; and
navigating the data tree based upon the one more address objects.

12. The server computing device of claim 7, wherein an address object for a top of the data tree has a predefined value indicating that the address object corresponds to the top of the data tree.

13. A non-transitory computer-readable storage medium comprising instructions that, when executed by a processor of a server computing device that is in network communication with a client computing device, cause the processor to perform acts comprising:
receiving, from the client computing device, a request to modify a field of data in a data tree stored at the server computing device, wherein the field of data is identifiable in the data tree by a field key received from the client computing device, wherein the field key comprises a field address number (FAN) and a new row key (NRK);
based upon a value of the NRK, determining whether the field of data was rendered for display at the client computing device;
when the value of the NRK indicates that the field of data was rendered for display at the client computing device, locating an address object in a sequential array based upon the FAN of the field key, wherein the address object comprises a first integer that identifies the address object in the sequential array and a second integer that identifies a parent address object of the address object, wherein the address object is usable to locate the field of data in the data tree;
when the value of the NRK indicates that the field of data was not rendered for display:
locating an entry for the field key in a field key lookup map, wherein a second FAN is mapped to the entry for the field key in the field key lookup map; and locating the address object in the sequential array based upon the second FAN; and locating the field of data in the data tree based upon the address object; and responsive to locating the field of data in the data tree, modifying the field of data in the data tree in accordance with the request received from the client computing device, wherein the modified field of data in the data tree is subsequently caused by the server computing device to be displayed on display.

14. The non-transitory computer-readable storage medium of claim 13, the acts further comprising:

when the value of the NRK indicates that the field of data was not rendered for display, prior to locating the entry for the field key in the field key lookup map, determining a template address object based upon the FAN of the field key.

15. The non-transitory computer-readable storage medium of claim 13, the acts further comprising:

prior to receiving the request to modify the field of data in the data tree, receiving a request to add the field of data to the data tree from the client computing device; and responsive to receiving the request to modify the field of data in the data tree, assigning the NRK to the field of data.

16. The non-transitory computer-readable storage medium of claim 13, wherein the data tree comprises a plurality of tables and a plurality of rows that reference a number of layers within the data tree.

17. The non-transitory computer-readable storage medium of claim 13, wherein locating the field of data in the data tree based upon the address object comprises:

determining one or more address objects between the address object and a second address object identifying a top of the data tree; and navigating the data tree based upon the one more address objects.

* * * * *